(12) United States Patent
Shimazoe (10) Patent No.: US 10,854,894 B2
(45) Date of Patent: Dec. 1, 2020

(54) METHOD OF MANUFACTURING PLATE-INTEGRATED GASKET

(71) Applicant: NOK CORPORATION, Tokyo (JP)

(72) Inventor: Toshihiro Shimazoe, Makinohara (JP)

(73) Assignee: NOK CORPORATION

( * ) Notice: Subject to any disclaimer, the term of this patent is extended or adjusted under 35 U.S.C. 154(b) by 501 days.

(21) Appl. No.: 15/324,644

(22) PCT Filed: Jun. 16, 2015

(86) PCT No.: PCT/JP2015/067227
§ 371 (c)(1),
(2) Date: Jan. 6, 2017

(87) PCT Pub. No.: WO2016/013331
PCT Pub. Date: Jan. 28, 2016

(65) Prior Publication Data
US 2017/0207468 A1     Jul. 20, 2017

(30) Foreign Application Priority Data

Jul. 25, 2014   (JP) .................................. 2014-151773

(51) Int. Cl.
*H01M 8/0286*   (2016.01)
*B29C 45/14*    (2006.01)
(Continued)

(52) U.S. Cl.
CPC ..... *H01M 8/0286* (2013.01); *B29C 45/14065* (2013.01); *B29C 45/14336* (2013.01);
(Continued)

(58) Field of Classification Search
CPC .............. H01M 8/0286; H01M 8/0271; B29C 45/14344; B29C 2045/14459;
(Continued)

(56) References Cited

U.S. PATENT DOCUMENTS 3,061,321 A * 10/1962 Smith .................... B29C 45/14
                                                     277/637
3,231,289 A *  1/1966 Carrell .................. F16J 15/067
                                                     277/632
(Continued)

FOREIGN PATENT DOCUMENTS

CN       101136481 A     3/2008
EP         2202833 A2    6/2010
(Continued)

OTHER PUBLICATIONS

Extended European Search Report for Application No. EP 15 82 4972 dated May 8, 2017 (8 pages).

*Primary Examiner* — Matthew J Daniels
*Assistant Examiner* — Andrew D Graham
(74) *Attorney, Agent, or Firm* — Harness, Dickey & Pierce, P.L.C.

(57) ABSTRACT

To effectively prevent a breakage of a plate when a gasket body formed of a rubber-like elastic material is integrally molded at both faces of the plate formed of a brittle material such as carbon. In order to attain this object, there is provided a method of manufacturing a plate-integrated gasket in which a gasket body formed of a rubber-like elastic material is integrally formed at both sides of a portion along a peripheral edge of a plate in the thickness direction, where an area located between gasket molding cavities defined by clamping the plate between split dies of a metal mold in the plate is formed to be a relatively thick portion at a position, facing an opening of a gate through which a molding material is injected into the cavities, and in the vicinity thereof.

3 Claims, 5 Drawing Sheets

US 10,854,894 B2

Page 2

(51) Int. Cl.
*H01M 8/0284* (2016.01)
*F16J 15/10* (2006.01)
*H01M 8/0254* (2016.01)
*H01M 8/0276* (2016.01)
*B29K 21/00* (2006.01)
*B29L 31/26* (2006.01)
*B29L 31/34* (2006.01)

(52) U.S. Cl.
CPC ......... F16J 15/108 (2013.01); H01M 8/0284 (2013.01); *B29C 2045/14098* (2013.01); *B29C 2045/14459* (2013.01); *B29K 2021/00* (2013.01); *B29K 2905/00* (2013.01); *B29K 2995/0046* (2013.01); *B29L 2031/265* (2013.01); *B29L 2031/3468* (2013.01); *H01M 8/0254* (2013.01); *H01M 8/0276* (2013.01); *Y02P 70/56* (2015.11)

(58) Field of Classification Search
CPC ........ B29C 2045/0089; B29C 45/1671; B29C 45/1676; B29C 70/763; B29C 70/76; B29C 70/745; B29C 66/304; B29C 66/225; F16J 15/108
See application file for complete search history.

(56) References Cited

U.S. PATENT DOCUMENTS

| | | | | |
|---|---|---|---|---|
| 3,754,846 A * | 8/1973 | Choate | B29C 45/14 | 425/125 |
| 4,070,219 A * | 1/1978 | Famam | F16J 15/104 | 156/192 |
| 4,158,757 A * | 6/1979 | Reichert | H01H 9/04 | 174/564 |
| 4,819,953 A * | 4/1989 | Joh | B29C 70/76 | 277/316 |
| 5,741,446 A * | 4/1998 | Tahara | B29C 45/0005 | 249/115 |
| 5,766,472 A * | 6/1998 | Tzakis | B01D 29/012 | 210/485 |
| 5,772,822 A * | 6/1998 | Dupuy | B29C 33/44 | 156/108 |
| 6,165,407 A * | 12/2000 | Tahara | B29C 45/37 | 249/111 |
| 6,165,634 A * | 12/2000 | Krasij | H01M 8/0267 | 429/434 |
| 6,231,053 B1 * | 5/2001 | Wakamatsu | H01M 8/0271 | 277/628 |
| 6,337,120 B1 * | 1/2002 | Sasaki | H01M 8/0271 | 428/304.4 |
| 6,500,580 B1 * | 12/2002 | Marvin | H01M 8/0273 | 429/457 |
| 6,599,650 B2 * | 7/2003 | Wu | H01M 8/0258 | 429/435 |
| 6,623,684 B1 * | 9/2003 | Satoh | B29C 45/0025 | 264/259 |
| 6,783,486 B1 * | 8/2004 | Murakami | B29C 45/14344 | 225/96 |
| 7,063,911 B1 * | 6/2006 | Nagai | B29C 45/14344 | 429/435 |
| 7,070,876 B2 * | 7/2006 | Artibise | H01M 8/0276 | 429/483 |
| 7,226,685 B2 * | 6/2007 | Kuroki | H01M 4/8605 | 429/509 |
| 7,655,339 B1 * | 2/2010 | Kummerow | H01M 8/0247 | 29/623.1 |
| 7,687,180 B2 * | 3/2010 | Haycock | H01M 8/242 | 429/406 |
| 7,749,635 B2 * | 7/2010 | Kuroki | F16J 15/0818 | 277/650 |
| 2001/0019791 A1 * | 9/2001 | Gooch | C07F 5/025 | 429/483 |
| 2002/0041054 A1 * | 4/2002 | Leicht | F16J 15/108 | 264/255 |
| 2002/0051902 A1 * | 5/2002 | Suenaga | H01M 8/0273 | 429/535 |
| 2002/0094464 A1 * | 7/2002 | Wangerow | H01M 8/0271 | 429/434 |
| 2002/0122970 A1 * | 9/2002 | Inoue | B29C 45/14344 | 264/154 |
| 2003/0013000 A1 * | 1/2003 | Kuroki | H01M 8/0271 | 429/431 |
| 2003/0087142 A1 * | 5/2003 | Kobayashi | H01M 8/0271 | 429/469 |
| 2003/0091885 A1 * | 5/2003 | Kobayashi | H01M 8/0273 | 29/623.2 |
| 2003/0104262 A1 * | 6/2003 | Kuroki | H01M 8/0213 | 429/510 |
| 2003/0152819 A1 * | 8/2003 | Hatoh | H01M 8/0221 | 429/437 |
| 2004/0131918 A1 * | 7/2004 | Ohara | H01M 8/0213 | 429/437 |
| 2004/0151972 A1 * | 8/2004 | Turpin | C25B 9/00 | 429/457 |
| 2004/0160019 A1 * | 8/2004 | Williams | H01M 8/0273 | 277/628 |
| 2004/0170882 A1 * | 9/2004 | Ohara | H01M 8/0206 | 429/444 |
| 2004/0197633 A1 * | 10/2004 | Yamamoto | H01M 8/0226 | 429/434 |
| 2004/0214071 A1 * | 10/2004 | Barnett | H01M 8/0271 | 429/457 |
| 2005/0118484 A1 * | 6/2005 | Kawachi | H01M 8/0206 | 429/509 |
| 2005/0127615 A1 * | 6/2005 | Matsuki | F16J 15/122 | 277/592 |
| 2005/0136317 A1 * | 6/2005 | Ferguson | H01M 8/0221 | 429/457 |
| 2005/0142414 A1 * | 6/2005 | Kimura | H01M 8/0247 | 429/508 |
| 2006/0073226 A1 * | 4/2006 | Kimura | B29C 45/14336 | 425/129.1 |
| 2006/0108709 A1 | 5/2006 | Inoue et al. | | |
| 2006/0131819 A1 | 6/2006 | Kurano et al. | | |
| 2006/0269818 A1 * | 11/2006 | Inoue | F16J 15/0818 | 429/508 |
| 2007/0003821 A1 * | 1/2007 | Belchuk | H01M 8/0273 | 429/465 |
| 2007/0059571 A1 * | 3/2007 | Andrin | C25B 9/00 | 429/435 |
| 2007/0065705 A1 * | 3/2007 | Boucher | H01M 8/0273 | 429/483 |
| 2007/0108657 A1 * | 5/2007 | Ferguson | B29C 45/14065 | 264/272.11 |
| 2007/0196716 A1 * | 8/2007 | Mashimo | H01M 8/0247 | 429/482 |
| 2007/0264557 A1 * | 11/2007 | Kobayashi | H01M 8/0258 | 429/483 |
| 2007/0298310 A1 * | 12/2007 | Kato | H01M 4/861 | 429/509 |
| 2008/0032176 A1 * | 2/2008 | Shimizu | C08G 59/3218 | 429/509 |
| 2008/0128955 A1 * | 6/2008 | Lim | B29C 35/0888 | 264/488 |
| 2008/0213649 A1 * | 9/2008 | Okabe | H01M 8/0273 | 429/483 |
| 2009/0029217 A1 * | 1/2009 | Kawabata | H01M 8/0247 | 429/433 |
| 2009/0075143 A1 | 3/2009 | Kurano et al. | | |
| 2009/0136811 A1 * | 5/2009 | Kusakabe | H01M 8/0273 | 429/492 |
| 2009/0155661 A1 * | 6/2009 | Morimoto | H01M 8/0273 | 429/469 |
| 2009/0197146 A1 * | 8/2009 | Nonogaki | B29C 45/14065 | 429/508 |
| 2009/0202884 A1 * | 8/2009 | Morimoto | H01M 8/2483 | 429/494 |

(56) References Cited

U.S. PATENT DOCUMENTS

| | | | | |
|---|---|---|---|---|
| 2009/0261502 A1* | 10/2009 | Arai | ................... | H01M 8/0273 264/259 |
| 2009/0286121 A1* | 11/2009 | Morimoto | ........... | H01M 8/0273 429/494 |
| 2010/0237538 A1 | 9/2010 | Kimura et al. | | |
| 2010/0264558 A1 | 10/2010 | Kimura et al. | | |
| 2011/0014540 A1* | 1/2011 | Yui | ..................... | H01M 8/0276 429/480 |
| 2011/0014541 A1* | 1/2011 | Yui | ..................... | H01M 8/0276 429/480 |
| 2011/0053048 A1* | 3/2011 | Shimazoe | ........... | H01M 8/0276 429/516 |
| 2011/0097647 A1* | 4/2011 | Iju | ...................... | B29C 45/0025 429/509 |
| 2011/0104583 A1* | 5/2011 | Urakawa | ........... | B29C 45/14311 429/469 |
| 2011/0127692 A1* | 6/2011 | Watanabe | ......... | B29C 45/14336 264/251 |
| 2011/0200911 A1* | 8/2011 | Shimazoe | ........... | H01M 8/0276 429/482 |
| 2011/0236785 A1* | 9/2011 | Imura | ................ | H01M 8/2418 429/479 |
| 2011/0318665 A1* | 12/2011 | Yamamoto | .......... | H01M 8/0273 429/469 |
| 2012/0018927 A1* | 1/2012 | Watanabe | ........... | B29C 45/2669 264/500 |
| 2012/0107718 A1* | 5/2012 | Masaka | ............... | H01M 8/0202 429/482 |
| 2013/0065158 A1* | 3/2013 | Masaka | ................. | F16J 15/104 429/516 |
| 2013/0089808 A1* | 4/2013 | Yoshikawa | ......... | H01M 8/0276 429/490 |
| 2013/0154150 A1* | 6/2013 | Shimazoe | ......... | B29C 45/14344 264/161 |
| 2013/0161870 A1* | 6/2013 | Manigatter | ........... | B29C 45/322 264/297.8 |
| 2014/0080027 A1* | 3/2014 | Poirot-Crouvezier | ...................... | H01M 8/0276 429/457 |
| 2014/0335218 A1* | 11/2014 | Shim | ....................... | B29C 33/38 425/547 |
| 2014/0377679 A1* | 12/2014 | Yamamoto | ........... | H01M 8/006 429/454 |
| 2015/0145384 A1* | 5/2015 | Lee | ..................... | B29C 45/1418 312/223.1 |
| 2015/0295210 A1* | 10/2015 | Horimoto | .............. | F16J 15/122 277/654 |
| 2016/0111735 A1* | 4/2016 | Shimazoe | ........... | H01M 8/0276 429/508 |
| 2016/0359177 A1* | 12/2016 | Fujii | ................ | H01M 8/1007 |
| 2017/0120488 A1* | 5/2017 | Hayashi | ............... | H01M 8/0286 |
| 2018/0104872 A1* | 4/2018 | Kurano | ............... | H01M 8/0276 |

FOREIGN PATENT DOCUMENTS

| | | |
|---|---|---|
| JP | 2001-121584 A | 5/2001 |
| JP | 2003-083165 A | 3/2003 |
| JP | 2004-202861 A | 7/2004 |
| JP | 2004-245341 A | 9/2004 |
| JP | 2005-098476 A | 4/2005 |
| JP | 2007-080612 A | 3/2007 |
| JP | 2009-281528 A | 12/2009 |
| JP | 2010-180963 A | 8/2010 |
| JP | 2011-096545 A | 5/2011 |
| WO | WO-01-04983 A1 | 1/2001 |
| WO | WO-2004-058478 A1 | 7/2004 |
| WO | WO-2005-004264 A1 | 1/2005 |
| WO | WO-2009-142082 A1 | 11/2009 |

\* cited by examiner

METHOD OF MANUFACTURING PLATE-INTEGRATED GASKET

CROSS-REFERENCE TO RELATED APPLICATIONS

This application is a U.S. National Stage Application of International Application No. PCT/JP2015/067227, filed on Jun. 16, 2015, and published in Japanese as WO 2016/013331 A1 on Jan. 28, 2016. This application claims priority to Japanese Application No. 2014-151773, filed on Jul. 25, 2014. The entire disclosures of the above applications are incorporated herein by reference.

BACKGROUND OF THE INVENTION

Field of the Invention

The present invention relates to a method of manufacturing a plate-integrated gasket in which a gasket body formed of a rubber-like elastic material is integrally formed at both faces of a peripheral edge portion of a plate such as a separator constituting, for example, a fuel battery cell.

Description of the Conventional Art

A fuel battery has a stack structure in which a plurality of fuel battery cells are stacked. Here, the fuel battery cell is formed in such a manner that a gas diffusion layer is disposed in the thickness direction at both sides of a membrane electrode assembly (MEA) having a pair of electrode layers at both faces of an electrolyte membrane and a separator is laminated thereon. A gasket for sealing a fuel gas or an oxidant gas is used in each fuel battery cell. As such a gasket, a plate-integrated gasket 100 shown in FIG. 7 is known in recent years.

Figure 7:
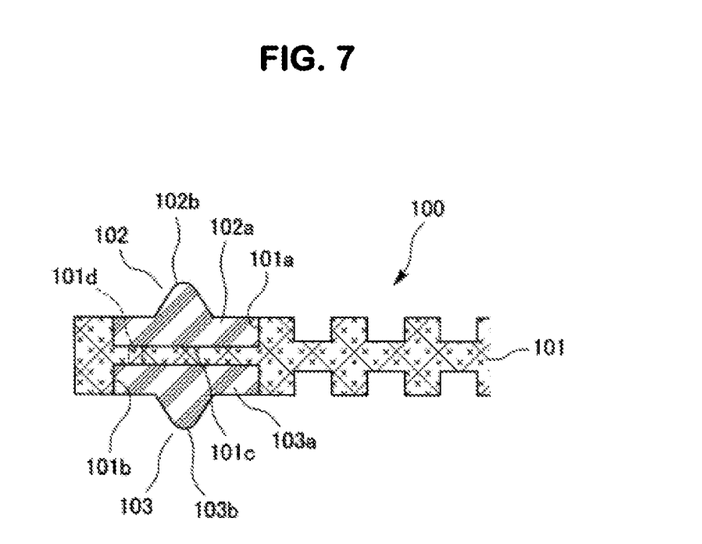
FIG. 7 is a partially cross-sectional view showing a plate-integrated gasket manufactured by the related art.

The plate-integrated gasket 100 shown in FIG. 7 has a configuration in which gasket bodies 102 and 103 formed of a rubber-like elastic material (a rubber material or a synthetic resin material having rubber-like elasticity) are integrally formed at both sides in the thickness direction of a portion along a peripheral edge of a carbon plate 101 serving as a separator of a fuel battery cell. Here, the gasket bodies 102 and 103 respectively include base portions 102a and 103a which are charged into belt-shaped grooves 101a and 101b formed at both faces of the carbon plate 101 and seal lips 102b and 103b which are projected from intermediate portions thereof in the width direction. The base portions 102a and 103a formed at both sides in the thickness direction communicate with each other through a through-hole 101d opened in a thin portion 101c between the belt-shaped grooves 101a and 101b of the carbon plate 101.

Figure 8:
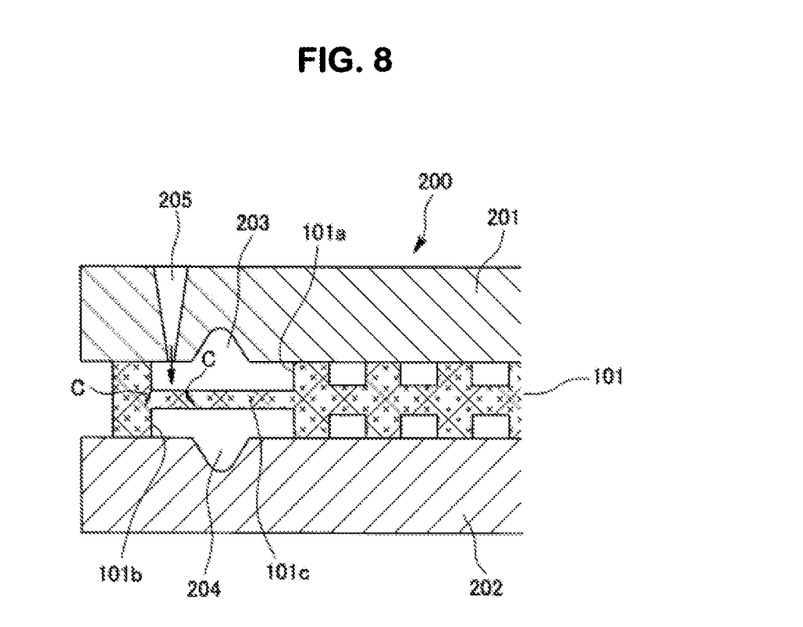
FIG. 8 is a partially cross-sectional view showing an example of a method of manufacturing a plate-integrated gasket according to the related art in a state where a metal mold is clamped.
Figure 9:
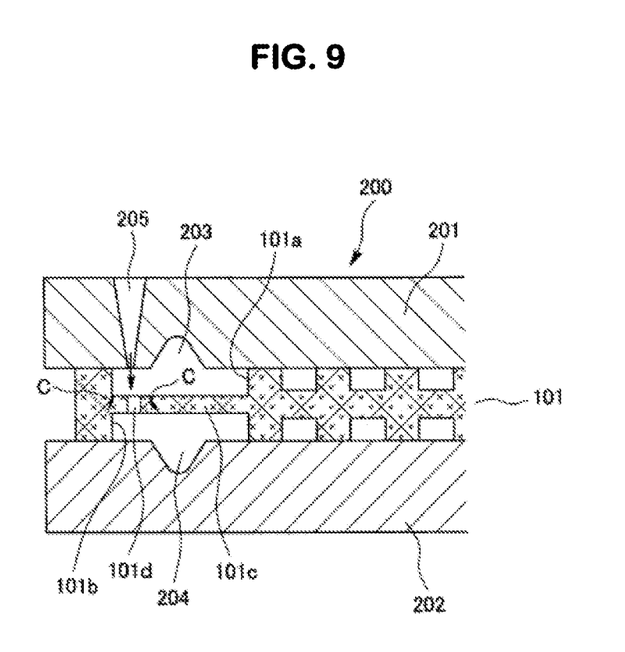
FIG. 9 is a partially cross-sectional view taken along a cutting position different from FIG. 8 in a state where a metal mold is clamped.

When such a plate-integrated gasket 100 is manufactured, a metal mold 200 shown in FIGS. 8 and 9 is used to integrally mold the carbon plate 101 and the gasket bodies 102 and 103. That is, the carbon plate 101 is disposed to be positioned between split dies 201 and 202 of the metal mold 200 and a molding liquid rubber material is charged into cavities 203 and 204 defined between the split dies 201 and 202 and the belt-shaped grooves 101a and 101b at both faces of the carbon plate 101 by a clamping operation. A gate 205 which is a liquid rubber material supply port is opened only to the cavity 203. However, since the cavities 203 and 204 communicate with each other through the through-hole 101d opened in the carbon plate 101 as shown in FIG. 9, the liquid rubber material injected from the gate 205 to the cavity 203 flows from the cavity 203 into the cavity 204 through the through-hole 101d to be molded.

SUMMARY OF THE INVENTION

Problem to be Solved by the Invention

However, since the carbon plate 101 is brittle, there is concern that a breakage C caused by the liquid rubber material injection pressure applied from the gate 205 may occur in the thin portion 101c between the belt-shaped grooves 101a and 101b. Particularly, since the liquid rubber material injection pressure is directly applied from the gate 205 to the vicinity of the position facing the opening of the gate 205 in the thin portion 101c, the breakage C easily occurs. Further, as shown in FIG. 9, there is concern that the breakage C is caused from the through-hole 101d in a portion provided with the through-hole 101d.

The invention is made in view of the above-described circumstances and a technical object of the invention is to provide a method of manufacturing a plate-integrated gasket capable of effectively preventing a breakage of a plate when a gasket body formed of a rubber-like elastic material is integrally formed at both faces of the plate formed of a brittle material such as carbon.

Means for Solving the Problem

In order to effectively solve the above-described technical object, according to a first aspect of the invention, there is provided a method of manufacturing a plate-integrated gasket in which a gasket body formed of a rubber-like elastic material is integrally formed at both sides of a peripheral edge portion of a plate in the thickness direction, in which an area located between gasket molding cavities defined by clamping the plate between split dies of a metal mold in the plate is formed to be relatively thick at a position, facing an opening of a gate through which a molding material is injected into the cavities, and in the vicinity of the position.

According to the above-described method, when a molding material is injected from the gate into the gasket molding cavities defined at both sides in the thickness direction of the portion along the peripheral edge of the plate by clamping the plate between the split dies of the metal mold, the gasket body formed of the rubber-like elastic material is integrally formed at both sides of the portion along the peripheral edge of the plate in the thickness direction. In the clamping operation, the plate receives a molding material injection pressure applied from the gate by the relatively thick portion in an area between the cavities since an area located between the cavities in the plate is formed at a position facing the opening of the gate and in the vicinity of the position to be relatively thick. Then, since the portion is relatively thick, the mechanical strength is improved. For this reason, even when the plate is formed of a brittle material, a breakage caused by the molding material injection pressure hardly occurs.

According to a second aspect of the invention, there is provided the method of manufacturing the plate-integrated gasket according to the first aspect, in which a through-hole communicating the cavities at both side of the plate in the thickness direction is opened while being located at a relatively thick portion.

According to the above-described method, since a portion provided with the through-hole is relatively thick, a breakage from the through-hole hardly occurs.

According to a third aspect of the invention, there is provided the method of manufacturing the plate-integrated gasket according to the first or second aspect, in which the relatively thick portion extends from a sandwiched portion sandwiched by the metal mold.

According to the above-described method, since the relatively thick portion is supported by the sandwiched portion sandwiched between the split dies of the metal mold, a breakage caused by the molding material injection pressure hardly occurs.

According to a fourth aspect of the invention, there is provided the method of manufacturing the plate-integrated gasket according to any one of the first to third aspects, in which an extension portion is formed at a part of the cavity in the extension direction so that the cavity extends in the width direction, the gate is opened toward the extension portion, and the relatively thick portion in the area located between the cavities in the plate is formed to be located at the extension portion.

According to the above-described method, the mechanical strength of the relatively thick portion in an area located between the cavities in the plate is further improved.

Effect of the Invention

According to a method of manufacturing a plate-integrated gasket of the invention, it is possible to effectively prevent a breakage of a plate due to a molding material injection pressure applied from a gate when a gasket body formed of a rubber-like elastic material is integrally formed at both faces of the plate formed of a brittle material such as carbon.

DETAILED DESCRIPTION OF PREFERRED EMBODIMENT

Hereinafter, a method of manufacturing a plate-integrated gasket according to a preferred embodiment of the invention will be described with reference to the drawings.

Figure 1:
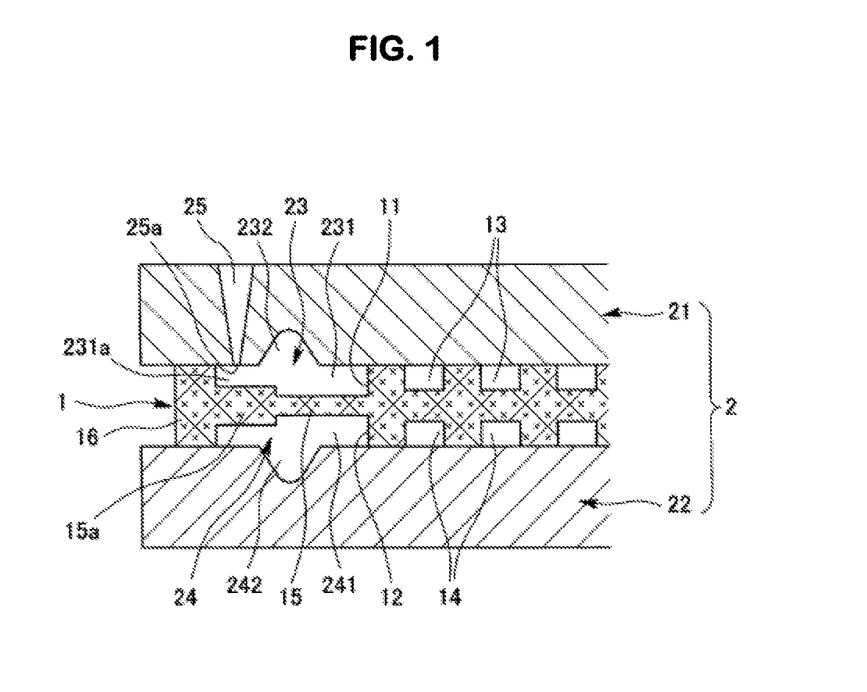
FIG. 1 is a partially cross-sectional view showing a method of manufacturing a plate-integrated gasket according to a first embodiment of the invention in a state where a metal mold is clamped.
Figure 2:
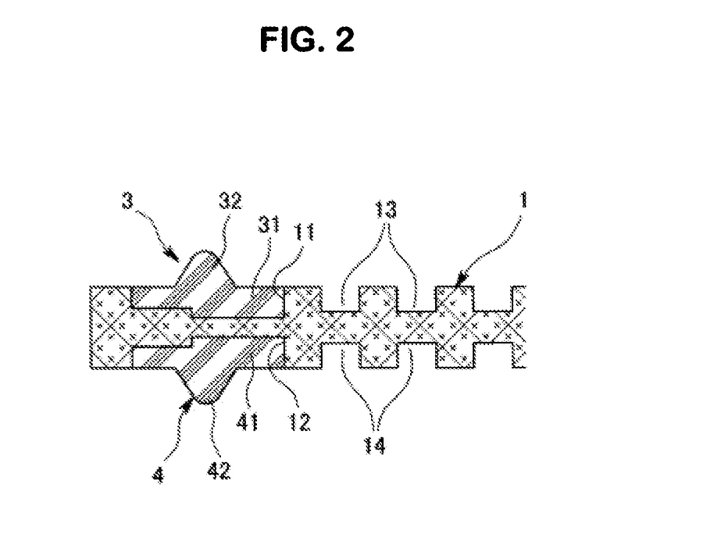
FIG. 2 is a partially cross-sectional view showing a plate-integrated gasket manufactured by the first embodiment.

FIG. 1 shows a first embodiment and FIG. 2 shows a plate-integrated gasket manufactured by a method of the first embodiment. First, in FIG. 1, Reference Numeral 1 indicates a plate assembled as a separator into a fuel battery cell and Reference Numeral 2 indicates a metal mold used to integrally injection-mold gasket bodies 3 and 4 formed at both sides of the peripheral edge portion of the plate 1 in the thickness direction and formed of a rubber-like elastic material (a rubber material or a synthetic resin material having rubber-like elasticity) as shown in FIG. 2.

The plate 1 is molded by carbon. Here, both faces of the plate in the thickness direction are provided with belt-shaped grooves 11 and 12 extending along peripheral edges (outer peripheral edges and opening edges) to have a symmetrical cross-sectional shape in the thickness direction and both faces at the inner areas of the belt-shaped grooves 11 and 12 in the thickness direction are provided with a plurality of flow grooves 13 and 14 used to circulate a reaction gas (a fuel gas and an oxidant gas) to the fuel battery cell.

The metal mold 2 includes split dies 21 and 22 capable of sandwiching the plate 1. That is, when the plate 1 is disposed to be positioned between the split dies 21 and 22 and is clamped, gasket molding cavities 23 and 24 are respectively defined among the split dies 21 and 22 and the belt-shaped grooves 11 and 12 at both sides of the peripheral edge portion of the plate 1 in the thickness direction. The cavities 23 and 24 have cross-sectional shapes corresponding to the negative-positive positions of the gasket bodies 3 and 4 shown in FIG. 2, That is, the cavities respectively include base portion molding portions 231 and 241 which correspond to base portions 31 and 41 charged into the belt-shaped grooves 11 and 12 of the plate 1 and seal lip molding portions 232 and 242 which correspond to seal lips 32 and 42 protruding in a mountain shape from the intermediate portions of the base portions 31 and 41 in the width direction. Both cavities 23 and 24 communicate with each other through a through-hole (not shown) opened between both cavities 23 and 24.

Further, a gate 25 which is a molding liquid rubber material supply port is opened in one split die 21 and an opening 25a at the downstream end of the gate 25 is located at a position near an outer peripheral portion 231a of the base portion molding portion 231 of one cavity 23 defined between the belt-shaped groove 11 of the plate 1 and the split die 21 when the metal mold 2 is clamped.

In the plate 1, a thick portion 15a, which is formed at a position facing the opening 25a of the gate 25 to be relatively thick in the vicinity thereof, is formed at an area between the cavities 23 and 24 defined while being sandwiched between the split dies 21 and 22 of the metal mold 2, in other words, a portion 15 between the belt-shaped grooves 11 and 12. The thick portion 15a may be formed to protrude from a sandwiched portion 16 sandwiched between the split dies 21 and 22 at the outer peripheries of the cavities 23 and 24 (the belt-shaped grooves 11 and 12) and to be continuous in the extension direction of the cavities 23 and 24 (the belt-shaped grooves 11 and 12), that is, a direction orthogonal to the cross-section of the drawing.

Then, in a case where the gasket bodies 3 and 4 are molded to be integrated with the plate 1, a molding liquid rubber material is injected into the cavities 23 and 24 defined at both sides of the plate 1 in the thickness direction in the clamping state shown in FIG. 1. Specifically, the liquid rubber material is first charged into one cavity 23 from the gate 25 opened at one split die 21 and then is charged into the other cavity 23 through a through-hole (not shown) opened in the portion 15 between the belt-shaped grooves 11 and 12.

At this time, the plate 1 receives a liquid rubber material injection pressure from the opening 25a of the gate 25 by the thick portion 15a at the portion 15 between the cavities 23 and 24 (the belt-shaped grooves 11 and 12). Then, the thick portion 15a is a portion that has high mechanical strength in the portion 15 between the cavities 23 and 24 (the belt-shaped grooves 11 and 12) and is supported by the sandwiched portion 16 sandwiched between the split dies 21 and 22 at the outer peripheries of the cavities 23 and 24 (the belt-shaped grooves 11 and 12). For this reason, even when the plate 1 is molded by carbon, a breakage caused by the liquid rubber material injection pressure is effectively prevented.

Then, when the liquid rubber material charged into the cavities 23 and 24 is cross-linked and cured, the gasket bodies 3 and 4 formed by the rubber-like elastic material and integrated with the plate 1 are molded as shown in FIG. 2.

Figure 3:
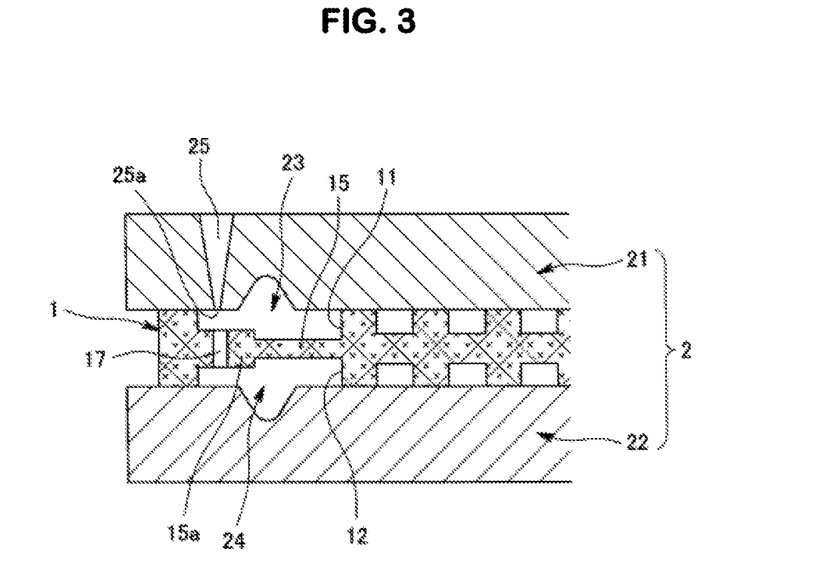
FIG. 3 is a partially cross-sectional view showing a method of manufacturing a plate-integrated gasket according to a second embodiment of the invention in a state where a metal mold is clamped.

FIG. 3 shows a method of manufacturing a plate-integrated gasket according to a second embodiment of the invention. The second embodiment is different from the first embodiment in that a through-hole 17 communicating the cavities 23 and 24 at both sides of the plate 1 in the thickness direction is opened at the relative thick portion 15a. Further, the through-hole 17 exists at a position facing the opening 25a of the gate 25. In this way, it is possible to effectively prevent a breakage from the through-hole 17 caused by the liquid rubber material injection pressure applied from the gate 25.

Figure 4:
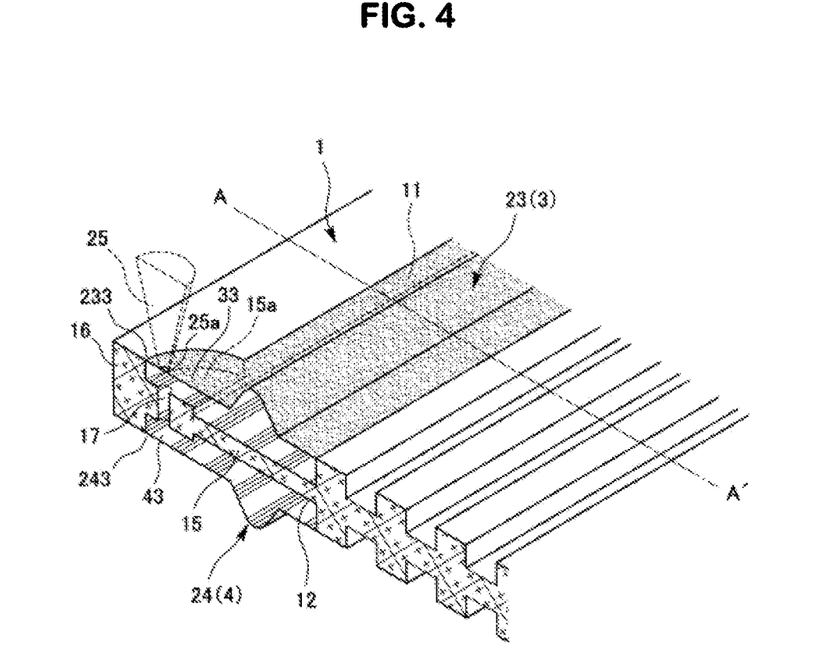
FIG. 4 is an explanatory diagram showing a method of manufacturing a plate-integrated gasket according to a third embodiment of the invention.
Figure 5:
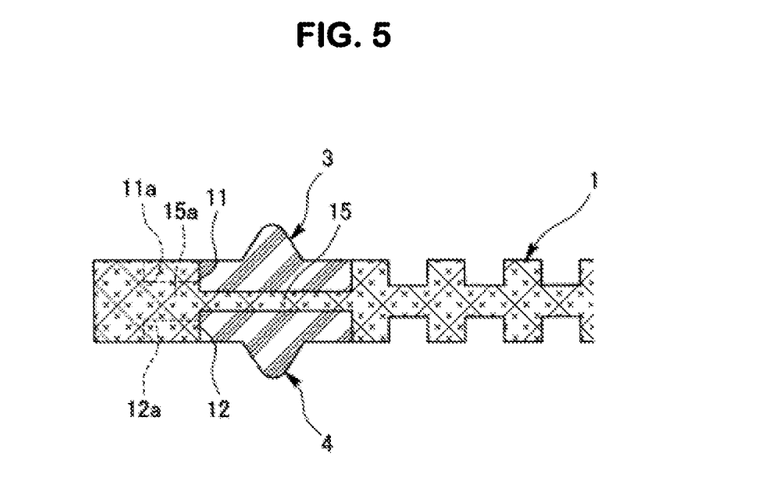
FIG. 5 is a cross-sectional view taken along a line A-A' of FIG. 4.

FIGS. 4 and 5 show a method of manufacturing a plate-integrated gasket according to a third embodiment of the invention. The third embodiment is different from the first embodiment in that extension portions 233 and 243 are formed in a part of the cavities 23 and 24 in the extension direction so that the cavities 23 and 24 extend outward in the width direction, the opening 25a of the gate 25 is opened at one extension portion 233, and the relative thick portion 15a in the portion 15 between the cavities 23 and 24 of the plate 1 is positioned between the extension portions 233 and 243. Then, as shown in FIG. 5, since notch portions 11a and 12a which are notched shallowly toward the peripheral edges of the plate 1 are formed at a predetermined interval in a part of the belt-shaped grooves 11 and 12 of the plate 1 in the extension direction, the extension portions 233 and 243 are formed between the notch portions 11a and 12a and the inner faces of the metal molds by the clamping operation and the thick portion 15a is formed as a portion between the notch portions 11a and 12a.

Further, the through-hole 17 communicating the cavities 23 and 24 at both sides of the plate 1 in the thickness direction is opened at the thick portion 15a. In other words, the through-hole is opened while being positioned inside the extension portions 233 and 243. Further, the through-hole 17 exists at a position facing the opening 25a of the gate 25.

According to this method, a portion which is formed by cross-linking and curing the liquid rubber material flowing into the extension portions 233 and 243 of the cavities 23 and 24 during the molding operation becomes projection portions 33 and 43 which are projected in the width direction from the base portions 31 and 41 charged into the belt-shaped grooves 11 and 12 of the plate 1 of the gasket bodies 3 and 4. Then, since the thick portion 15a facing the opening 25a of the gate 25 in the plate 1 is formed to be surrounded by the rising faces of the extension portions 233 and 243 (the notch portions 11a and 12a), that is, the sandwiched portion 16, the mechanical strength for the liquid rubber material injection pressure applied from the gate 25 is further improved. Further, even when a "sink" or the like occurs in the vicinity of the through-hole 17 due to the contracted volume of the rubber material in the cross-linking and curing state, the "sink" occurs in the projection portions 33 and 43 projected from the base portions 31 and 41 of the gasket bodies 3 and 4 in the width direction. For this reason, it is possible to effectively prevent a bad influence on the base portions 31 and 41 or the seal lips 32 and 42 due to the "sink".

Then, the molded plate-integrated gasket can have a uniform sealing property since a portion other than the projection portions 33 and 43 has a cross-sectional shape shown in FIG. 5.

Figure 6:
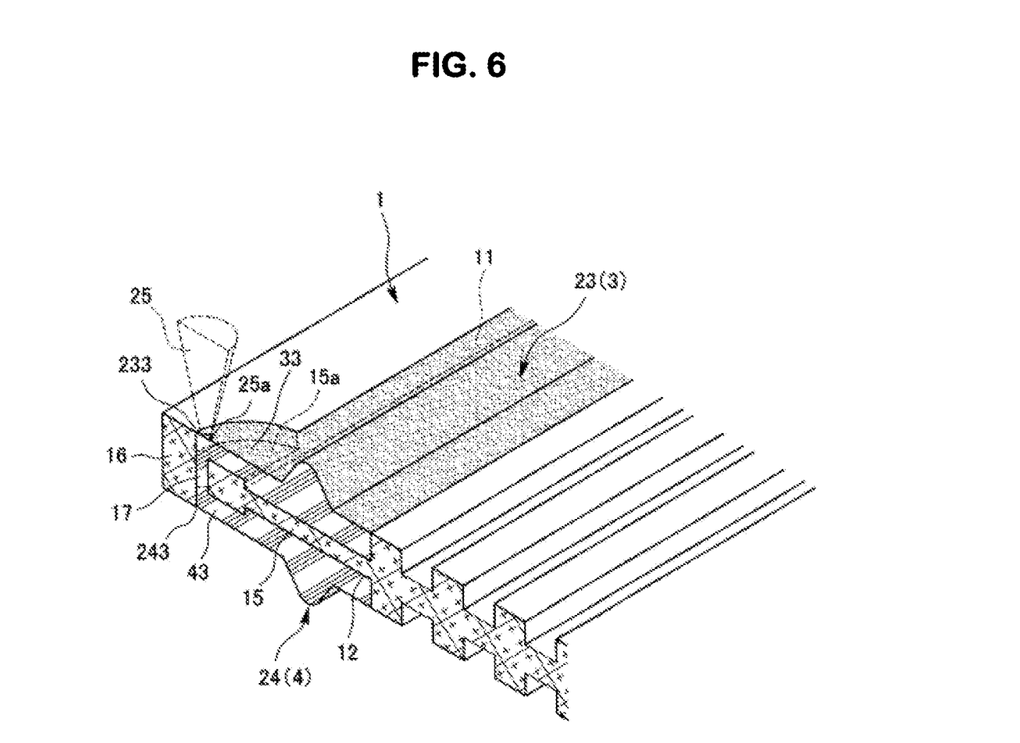
FIG. 6 is an explanatory diagram showing a partially modified example of the third embodiment shown in FIG. 4.

FIG. 6 shows a partially modified example of the third embodiment. That is, in the above-described example of FIG. 4, the through-hole 17 communicating the cavities 23 and 24 at both sides of the plate 1 in the thickness direction is opened at an intermediate portion of the thick portion 15a (the extension portions 233 and 243), but in the modified example, the through-hole is opened at the rising faces of the extension portions 233 and 243. With such a configuration, the mechanical strength of the thick portion 15a for the liquid rubber material injection pressure applied from the gate 25 is further improved. Accordingly, it is possible to effectively prevent a breakage from the through-hole 17 caused by the liquid rubber material injection pressure applied from the gate 25.

What is claimed is:

1. A method for manufacturing a plate-integrated gasket, comprising:

providing a plate having a first major surface and an opposing second major surface that are connected by a terminal edge of the plate, wherein the plate includes a first groove formed in the first major surface that is located inboard from the terminal edge, a second groove formed in the second major surface that is located inboard from the terminal edge and overlaps the first groove, the first groove and the second groove are separated by a wall that includes a through-hole formed therein that allows communication between the first groove and the second groove, and the wall includes a first portion that includes the through-hole and that has a thickness greater than a second portion thereof;

placing the plate in a metal mold having a first split die having a first cavity that corresponds to the first groove, and a second split die having a second cavity that corresponds to the second groove, wherein an extension portion is formed in each of the first and second split dies that is located inboard from the terminal edge of the plate, and outboard from the first and second grooves, the extension portions being circular in a plan view of the metal mold;

clamping the plate between the first split die and the second split die; and injecting a gasket material into the first cavity through a gate formed in the first split die, wherein the gasket material travels from the first cavity to the second cavity via the through-hole, and the first portion having the thickness greater than the second portion resists molding pressures that occur during the injecting of the gasket material, and the first portion having the thickness greater than the second portion is directly connected to an edge of each of the first and second grooves.

2. The method according to claim 1, wherein the through-hole is aligned with the gate in a planar view of the metal mold.

3. The method according to claim 1, wherein the first portion is located between the extension portion and the second portion.

* * * * *